Patented Feb. 6, 1945

2,368,823

UNITED STATES PATENT OFFICE 2,368,823

PREPARATION OF DRILLING MUDS

Allen D. Garrison, Houston, Tex., assignor, by mesne assignments, to The Texas Company, New York, N. Y., a corporation of Delaware No Drawing. Application August 25, 1937, Serial No. 160,820

5 Claims. (Cl. 252—8.5)

This invention relates to drilling muds and more particularly to the preparation and control of drilling muds employed in the drilling of wells.

More specifically, my invention relates to a method of controlling the colloidal and physical properties of a drilling mud so as to maintain it in the most desirable condition for use and which comprises adding sodium triphosphate to the drilling mud.

Drilling muds are used in the drilling of wells employed for tapping underground collections of oil, gas, brines or water. These muds fulfill various functions, the most important of which are to assist in the removal of cuttings from the well, to seal off formations of gas, oil and water which may be encountered at various levels, and to lubricate the drilling tool and the drill pipe which carry the tools.

Drilling muds are essentially mixtures of finely divided solids, such as clay, with water, usually so compounded that they weigh from eight to twelve pounds per gallon. Whenever it is found necessary to increase the specific gravity of a particular mud it is customary to add thereto finely divided materials which have a high specific gravity, such, for example, as iron oxide, barytes, litharge and the like.

The solid phase of a drilling mud consists of colloidal and non-colloidal particles. It is the colloidal particles which are responsible for the colloidal character of the drilling mud, and due to their presence drilling muds are essentially colloidal dispersions. An ideal drilling mud is a thixotropic colloidal system, that is to say, a fluid, which on agitation, as by pumping or otherwise, has a relatively low viscosity and is freeflowing, but when agitation is stopped gradually sets or gels. This gelling action is sufficiently slow to permit the cuttings to settle two or three feet before the gel structure which is developing during this time is strong enough to support them. For the purpose of convenience I intend that the term "thixotropic drilling mud" connote a drilling fluid having proper viscosity and the proper gel rate and gel strength. In use when such a drilling fluid is circulated through a well bore, it has sufficiently high viscosity to carry the cuttings and sand from the bottom of the hole to the surface, and it has a sufficiently slow gelling rate to allow the cuttings and sand to settle in a settling pit. On standing in a quiescent state it develops sufficient gel strength to prevent the settling of the cuttings, sand or barytes, etc., in the well bore itself when it becomes necessary to discontinue circulation for a period of time.

The use of a drilling mud which is non-thixotropic is attended by many disadvantages, all of which are well known to those skilled in the art of drilling wells. A non-thixotropic drilling mud is one which either develops no gel at all, or which flocculates rapidly enough to remain in a plastic state even while in motion. The former condition results in the settling of suspended solids to the bottom of the bore hole during periods of discontinued circulation. On the other hand, a drilling fluid which gels too rapidly is difficult to maintain free of cuttings and sand. Such a drilling mud of adequate viscosity at normal circulating rate easily becomes gas cut because of the recirculation of gas bubbles trapped by the rapid-forming gel or flocks. This is particularly dangerous in those cases where the bore hole traverses or encounters high gas pressures, because the gas cutting of the mud may so reduce the hydrostatic head of the drilling mud in the bore hole as to result in the blowing out of the well.

Drilling muds are generally prepared by suspending in water, clays which will yield thixotropic colloidal systems. Such clays contain in varying amounts complex colloidal alumino-silicates which are essentially acids whose anion is a micell of the general formula, $$X(Al_2O_3) - Y(SiO_2) - Z(H_2O)$$

where X is approximately 1, Y is approximately 3, and Z may vary over wide values. In the interest of simplicity, this anion will be termed hereinafter as clay and the compounds formed by its combination with various cations will be termed clays of cations; so, for example, the hydrogen compound will be termed hydrogen clay, the sodium compounds will be termed sodium clays, while the calcium compounds will be called calcium clays.

It has been observed that dispersions in water of either acid clays or multivalent ion clays tend to gel rapidly, and are very sensitive to coagulation by dissolved salts or impurities. Obviously such types of dispersions are undesirable as drilling fluids since small amounts of soluble salts in the formations being drilled cause either too high a gelling rate or actual flocculation. The alkali metal clays are more readily rendered thixotropic and require larger amounts of salts and impurities to cause rapid gelling and flocculation.

Although drilling fluids having satisfactory thixotropic properties may be prepared by the use of suitable clays, these desirable properties are lost in varying degrees during the penetration of certain shales, clays and water-bearing formations. This deterioration of thixotropic drilling muds may involve the conversion of monovalent ion clay into an acid clay or a multivalent ion clay. The former occurs when the thixotropic drilling mud encounters acid stata; the latter, which is the more common, occurs when the drilling mud encounters strata of calcium and magnesium clays or soluble compounds. Under such circumstances a phenomenon known as base exchange occurs whereby the monovalent ion clays are converted into multivalent ion clays, and are thereby rendered more sensitive to flocculating impurities.

Flocculation or coagulation of any of the types of clays by flocculating materials such as salt encountered during drilling and the rapid accumulation of colloidal matter from shales or clays penetrated increase both the viscosity of the drilling mud and its gel strength to undesirably high values. Dilution of the mud with water, which is frequently employed to remedy this condition, is particularly undesirable if high gas pressures are encountered, since the specific gravity of the fluid is thereby lowered and more gas permitted to enter the well bore.

I have discovered that sodium triphosphate not only possesses the property of reducing the viscosity of drilling muds, but also possesses the unusual property of reducing the gel strengths of drilling muds to which it is added in small amounts to the point at which sand and cuttings are substantially completely settled out of the drilling muds. Tests carried out by me with a mixture of caustic soda and quebracho, with sodium hexametaphosphate, sodium thiotetraphosphate, di-sodium hydrogen phosphate and sodium triphosphate, showed that sodium triphosphate far surpassed any of the other chemicals in its desanding properties.

In order that those skilled in the art may more readily appreciate the particular effectiveness of sodium triphosphate, I give herewith several examples of the practice of my invention in which sodium triphosphate was used for reducing the viscosity of a drilling mud. I also offer for purposes of comparison the tests obtained on a sample of the same type of drilling mud treated with given amounts of sodium hexametaphosphate.

The sodium triphosphate employed in the experiments was prepared by fusing together a mixture of anhydrous sodium pyrophosphate and sodium metaphosphate at a red heat and then quickly cooling the melt by pouring the same in a thin layer upon an iron plate. The reaction between the sodium pyrophosphate and the sodium metaphosphate may be designated as follows:

$$Na_4P_2O_7 + NaPO_3 = Na_5P_3O_{10}$$

The drilling mud used in the following experiments consisted of a suspension in water of a shale obtained in the Manvel oil field at Manvel, Texas. This mud had a viscosity of 45 centipoises measured at a velocity of 600 R. P. M. in the Stormer viscosimeter. The reagents, sodium triphosphate and sodium hexametaphosphate, were added to samples of this drilling mud in amounts which are indicated in the following tables as grams per one hundred cc. of drilling mud. The viscosities appearing in the tables are the Stormer viscosities taken at 600 R. P. M.

TABLE I

*Effect of sodium triphosphate on the viscosity of a drilling mud having an original viscosity of 45 centipoises*

| Grams of sodium triphosphate per 100 cc. of drilling mud | Viscosity in centipoises |
|---|---|
| 0.01 | 35.0 |
| 0.02 | 30.0 |
| 0.03 | 29.0 |
| 0.04 | 28.2 |
| 0.05 | 28.0 |

TABLE II

*Effect of sodium hexametaphosphate on the viscosity of a drilling mud having an original viscosity of 45 centipoises*

| Grams of sodium hexametaphosphate per 100 cc. of drilling mud | Viscosity in centipoises |
|---|---|
| 0.01 | 39.5 |
| 0.02 | 37.0 |
| 0.04 | 33.7 |
| 0.06 | 33.0 |

It is obvious from the foregoing data in Tables I and II that sodium triphosphate is an effective viscosity reducing agent. In addition to its viscosity reducing action, sodium triphosphate has the additional property of so reducing the gel rates of drilling muds that its use permits of the selective settling of sand and cuttings from drilling muds.

The amounts of sodium triphosphate necessary to practice my invention depend upon numerous factors, such as the type of drilling mud to be treated, the amount of improvement or the degree of protection that is desired in the drilling mud, as well as the conditions of use. Those skilled in the art will appreciate that in view of the foregoing it is impossible to set any specific limitations as to the amounts of the reagent. I have found, however, that an amount within the range 0.001% to 0.1% by weight of the reagent will produce the desired result.

My invention may be carried out in several different ways. For example, I may prepare a drilling mud by incorporating the desired amount of sodium triphosphate directly in a suspension of clay in water, or I may add the necessary amount of this compound to a drilling mud which is flocculated in order to reduce its viscosity to a value at which the drilling mud can be effectively used. I also contemplate the continuous addition of a solution of sodium triphosphate to a drilling mud during use to prevent any substantial change in its colloidal and physical characteristics.

It is intended that the word "clay" as used herein shall include bentonite clays containing appreciable quantities of bentonite, as well as those clays which display the properties of deflocculating in water. I also intend that the term "finely divided solids" shall include both clays and all other finely divided water-insoluble solids, including materials such as iron oxide, barytes, litharge and the like, or any mixtures thereof.

Obviously many modifications and variations of the invention as hereinbefore set forth may be made without departing from the spirit and scope thereof, and only such limitations should be imposed as are indicated in the appended claims.

I claim:
1. A mud laden drilling fluid containing a small percentage of sodium triphosphate.
2. In the art of drilling wells by the employment of a drilling fluid, the process comprising adding to the drilling fluid a small percentage of sodium triphosphate.
3. A drilling mud comprising a finely-divided solid, water and sodium triphopshate.
4. A drilling mud comprising clay, water and from 0.001% to 0.1% by weight of sodium triphosphate.
5. In the art of drilling and controlling wells in which a drilling mud is circulated in the bore hole, the process of reducing the viscosity of the mud comprising treating the mud with from 0.001% to 0.1% by weight of sodium triphosphate.

ALLEN D. GARRISON.